(12) United States Patent
Gledhill

(10) Patent No.: US 10,932,993 B2
(45) Date of Patent: Mar. 2, 2021

(54) PERSONALIZED PACIFIER AND BOTTLE NIPPLE

(71) Applicant: Brittany Gledhill, Tucker, GA (US)

(72) Inventor: Brittany Gledhill, Tucker, GA (US)

( * ) Notice: Subject to any disclaimer, the term of this patent is extended or adjusted under 35 U.S.C. 154(b) by 162 days.

(21) Appl. No.: 16/102,341

(22) Filed: Aug. 13, 2018

(65) Prior Publication Data

US 2019/0046414 A1  Feb. 14, 2019

Related U.S. Application Data

(60) Provisional application No. 62/544,853, filed on Aug. 13, 2017.

(51) Int. Cl.
| *A61J 11/00* | (2006.01) |
| *A61J 17/00* | (2006.01) |
| *B29L 31/00* | (2006.01) |
| *B33Y 80/00* | (2015.01) |
| *B33Y 10/00* | (2015.01) |
| *B33Y 50/00* | (2015.01) |

(52) U.S. Cl.
CPC ..... *A61J 11/005* (2013.01); *B29L 2031/7412* (2013.01); *B33Y 10/00* (2014.12); *B33Y 50/00* (2014.12); *B33Y 80/00* (2014.12)

(58) Field of Classification Search
CPC .... A61J 11/00; A61J 11/0035; A61J 11/0045; A61J 11/005; A61J 17/001; B29C 2033/3871; B29C 2033/3857; G06T 15/205; B29L 2031/7412
See application file for complete search history.

(56) References Cited

U.S. PATENT DOCUMENTS

| 10,603,247 B2* | 3/2020 | Lofaro | B29C 39/003 |
| 2017/0312185 A1* | 11/2017 | Lofaro | B29C 33/3842 |
| 2018/0104156 A1* | 4/2018 | Mobbs | A61J 11/005 |
| 2018/0318177 A1* | 11/2018 | Bolten | A61J 11/005 |

OTHER PUBLICATIONS

Bücking, T.M. et al., From Medical Imaging Data to 3D Printed Anatomical Models. PLoS One. 2017; 12(5):e0178540.
GE Healthcare, Voluson E10. Retrieved from the Internet Oct. 16, 2018. <URL: www3.gehealthcare.com/en/products/categories/ultrasound/voluson/voluson_e10> (3 pages).
Hosny, A. et al., Unlocking Vendor-Specific Tags: Three-Dimensional Printing of Echocardiographic Data Sets. J Thorac Cardiovasc Surg. 2018; 155(1):143-5.
U.S. Appl. No. 62/544,853, filed Aug. 13, 2017, Brittany Gledhill.

* cited by examiner

*Primary Examiner* — Todd J Scherbel
(74) *Attorney, Agent, or Firm* — Ballard Spahr LLP

(57) ABSTRACT

Disclosed are artificial nipples and methods of producing artificial nipples. Disclosed are methods of producing an artificial nipple comprising imaging a nipple region of a breast, wherein at least a portion of the breast comprising the nipple region is distorted due to at least a partial vacuum created through motions of lips and a tongue, wherein the imaging provides imaging data of the nipple region; and generating, based on the imaging data, an artificial nipple.

9 Claims, 6 Drawing Sheets

PERSONALIZED PACIFIER AND BOTTLE NIPPLE

CROSS-REFERENCE TO RELATED APPLICATIONS

This application claims benefit of U.S. Provisional Application No. 62/544,853, filed Aug. 13, 2017 and hereby incorporated herein by reference in its entirety.

BACKGROUND

Conventional nipples on a bottle or pacifier are not able to distort in the exact manner that a nipple on a breast would distort in the presence of a partial vacuum created through motions of lips and a tongue. This can cause difficulties for a child to switch from breast feeding to bottle feeding or vice versa (e.g., nipple confusion). Thus, disclosed are artificial nipples and methods of making and using the same that prevents nipple confusion and provides a nipple in the naturally occurring distorted state under active lactation.

BRIEF SUMMARY

Disclosed are methods of producing an artificial nipple comprising imaging a nipple region of a breast, wherein at least a portion of the breast comprising the nipple region is distorted due to at least a partial vacuum created through motions of lips and a tongue, wherein the imaging provides imaging data of the nipple region; generating, based on the imaging data of the nipple region, a digital three dimensional representation of the nipple region of the breast; and generating, based on the digital three dimensional representation of the nipple region of the breast, an artificial nipple.

Disclosed are artificial nipples produced by imaging a nipple region of a breast, wherein at least a portion of the breast comprising the nipple region is distorted due to at least a partial vacuum created through motions of lips and a tongue, wherein the imaging provides imaging data of the nipple region; and generating, based on the imaging data of the nipple region, a digital three dimensional representation of the nipple region of the breast; and generating, based on the digital three dimensional representation of the nipple region of the breast, an artificial nipple.

Disclosed are methods of feeding a subject comprising placing an artificial nipple in the mouth of the subject, wherein the artificial nipple is attached to a container comprising food, wherein the artificial nipple is produced by imaging a nipple region of a breast, wherein at least a portion of the breast comprising the nipple region is distorted due to at least a partial vacuum created through motions of lips and a tongue, wherein the imaging provides imaging data of the nipple region; and generating, based on the imaging data of the nipple region, a digital three dimensional representation of the nipple region of the breast; and generating, based on the digital three dimensional representation of the nipple region of the breast, an artificial nipple.

Disclosed are methods of soothing a subject, comprising placing an artificial nipple in the mouth of the subject, wherein the artificial nipple is attached to a pacifier base wherein at least a portion of the breast comprising the nipple region is distorted due to at least a partial vacuum created through motions of lips and a tongue, wherein the imaging provides imaging data of the nipple region; and generating, based on the imaging data of the nipple region, a digital three dimensional representation of the nipple region of the breast; and generating, based on the digital three dimensional representation of the nipple region of the breast, an artificial nipple.

Additional advantages will be set forth in part in the description which follows, and in part will be understood from the description, or may be learned by practice. The advantages of the disclosed method and compositions will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed method and compositions and together with the description, serve to explain the principles of the disclosed methods, systems, and apparatuses.

DETAILED DESCRIPTION

Figure 1:
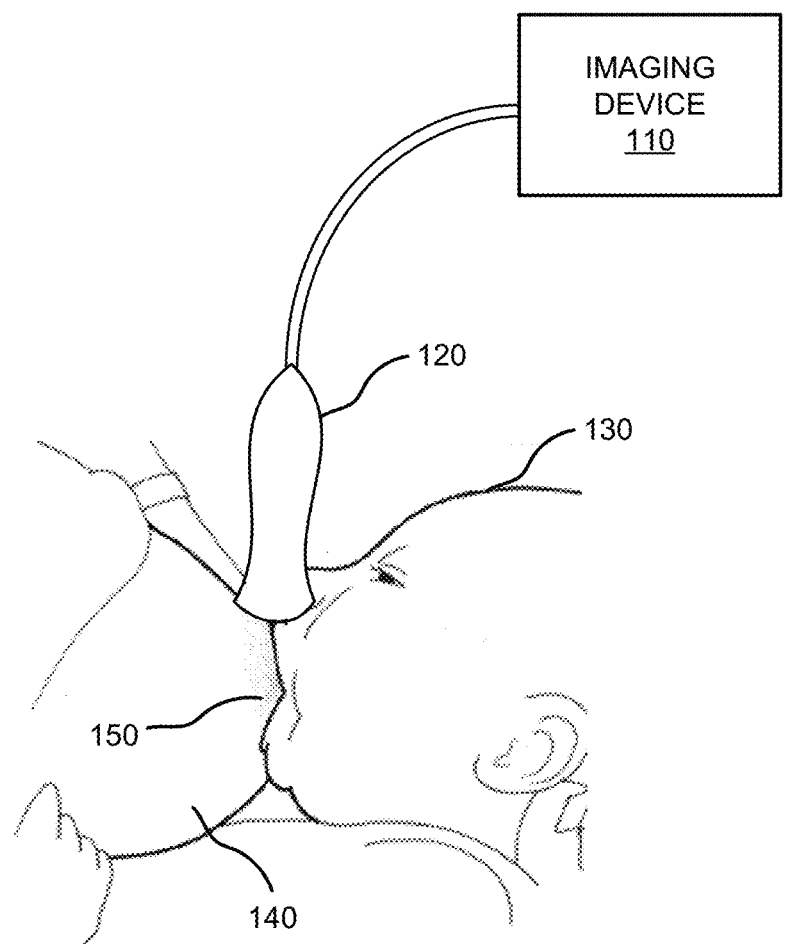
FIG. 1 is an image of a child nursing on the nipple region of a breast while the nipple region is being imaged.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Disclosed are artificial nipples and methods of producing artificial nipples.

Disclosed are methods of producing an artificial nipple comprising imaging a nipple region of a breast, wherein at least a portion of the breast comprising the nipple region is distorted due to at least a partial vacuum created through motions of lips and a tongue, wherein the imaging provides imaging data of the nipple region; and generating, based on the imaging data, an artificial nipple. In some instances, the disclosed methods of producing an artificial nipple can be performed on any breast. For example, in humans either the right breast or left breast can be used.

Nipple confusion can occur in babies that feed from both a breast and a bottle. The nipple of the bottle forms differently in the mouth of the child during feeding and therefore results in inconsistent latching during breastfeeding. This occurs because breastfeeding requires far more vigorous mouth and tongue motions and greater muscle coordination than does bottle-feeding. Thus, a newborn who is exposed to conventional bottle nipples or pacifiers can have difficulties breast feeding due to nipple confusion. Furthermore, as the nipple distorts to the shape of the child's mouth during breastfeeding, a soothing effect is provided that is not attained during bottle feeding with a conventional nipple.

In an aspect, shown in FIG. 1, an imaging device 110 and an imaging wand 120 can be used to generate image data (such as an ultrasonic image or sonogram) of an internal biological feature (IBF). The imaging device 110 and imaging wand 120 can be separate devices or can be contained fully within the imaging wand 120. The imaging device 110 and the imaging wand 120 can be any form of imaging system capable of imaging an IBF. For example, the imaging device 110 and the imaging wand 120 can comprise an ultrasound imaging system (e.g., 2D, 3D, 4D), a cone-beam computed tomography (CBCT) system, an X-ray imaging system (e.g. mammography system), or a camera.

Hereinafter, the imaging device 110 and the imaging wand 120 are described as an ultrasound imaging system as an example. To form any ultrasonic image or sonogram of an IBF or other such feature, the imaging wand 120 which contains an ultrasonic energy transducer is used. In a transmit mode, the transducer is electrically energized to transmit a fan-shaped scanning beam of ultrasonic energy; in a receive mode, the transducer receives ultrasonic signals reflected from an object and converts the ultrasonic signals to electrical signals which are used to form an image of the object on a monitor screen, e.g., on a screen of the imaging device 110. The reflected signals received by the transducer can be displayed on the screen in a two-dimensional pattern corresponding to the scanned beam of ultrasonic energy emitted by the transducer when the transducer is operated in the transmit mode, the brightness or color of displayed image elements or pixels on the screen being proportional to the strength of the received signals. To form a three-dimensional visualization of an IBF or other feature of interest, a sequence of two-dimensional views or sonograms are made by varying the orientation and/or location of the ultrasound wand relative to the feature, thus causing the transmitted and received ultrasound beams to "slice" the feature at different angles and/or locations. Such visualizations of the three-dimensional shape of a feature, made from a sequence of two-dimensional image slices can be stored on the imaging device 110.

In some aspects, based on the imaging data of the nipple region 150, a digital three dimensional representation of the nipple region of the breast can be generated. Based on the digital three dimensional representation of the nipple region of the breast, an artificial nipple can be generated. In some aspects, a digital three dimensional representation can be used to produce a mold from which the artificial nipple is then generated. In some aspects, a digital three dimensional representation can directly be used to generate an artificial nipple by way of 3D printing (see FIG. 3).

As shown in FIG. 1, the imaging wand 120 can be used to scan a region where a child 130 is applying at least a partial vacuum to a nipple region 150 of a breast 140. The nipple region 140 is distorted from a resting state of the nipple region 140 due to the at least a partial vacuum created through motions of lips and a tongue of the child 130. In some instances, a partial vacuum created through motions of lips and a tongue is created due to a sucking motion. For example, a partial vacuum created through motions of lips and a tongue can be created by the child 130 latching on to at least a portion of the nipple region 150 of the breast 140. For example, the child can be nursing. Using a non-natural vacuum, such as a breast pump, to distort the nipple region of a breast results in a shape that is not natural to a child and therefore would not have the same soothing effect or be able to help with nipple confusion. While the nipple region 150 of a breast 140 is being distorted due to the at least a partial vacuum created through motions of the lips and the tongue of the child 130, at least the portion of the nipple region 150 being distorted can be imaged using the imaging wand 120 and/or the imaging device 110. The imaging wand 120 and/or the imaging device 110 can have 2D, 3D, and/or 4D imaging capabilities, thus resulting in 3D or 4D imaging data. In some instances, the imaging provides imaging data of the nipple region 150 while the child 130 is nursing on the nipple region 150 being imaged. The imaging data represents a three dimensional shape of the nipple region 150 as it is distorted from application of the at least a partial vacuum.

Figure 2A:
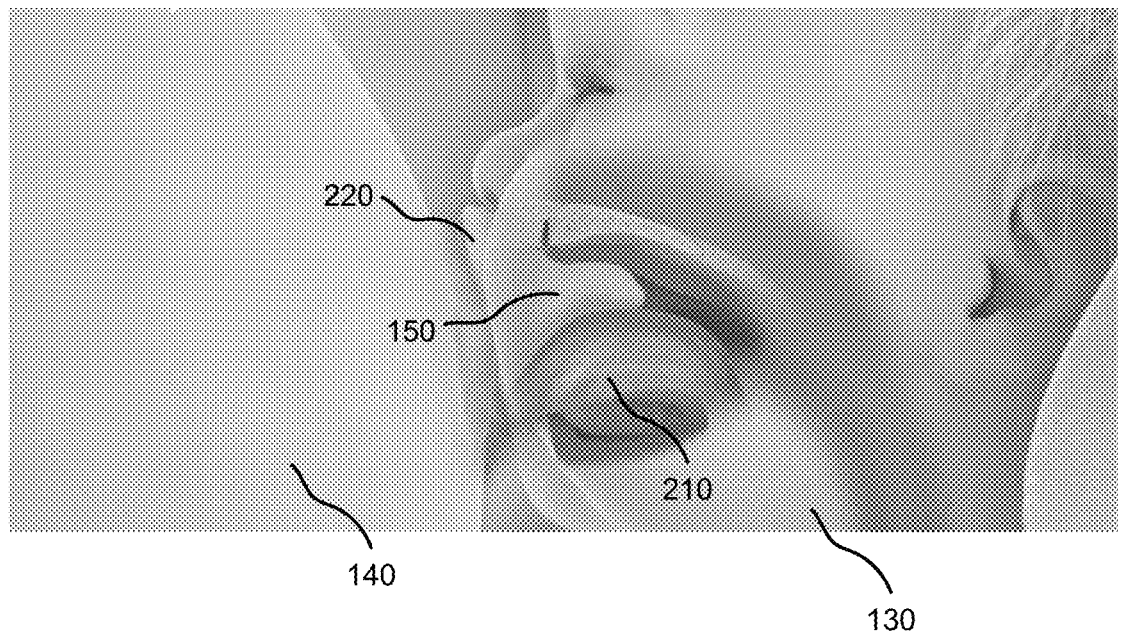
FIGS. 2A and 2B show images of the shape the nipple region of a breast distorts to during active lactation or nursing.
Figure 2B:
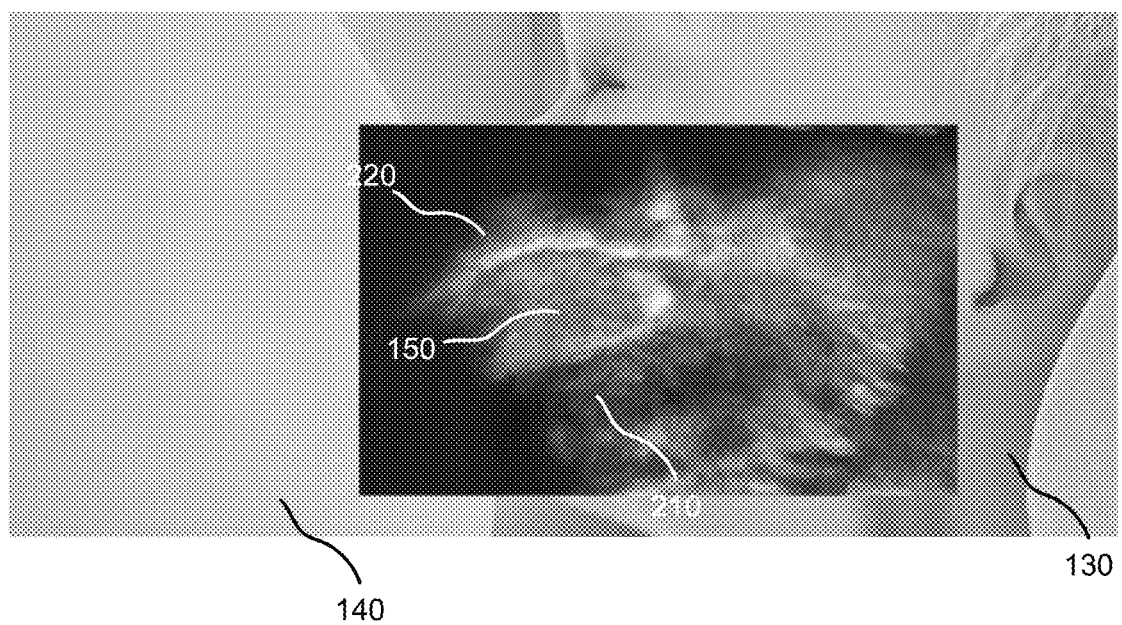

In an aspect, as shown in FIG. 2, FIG. 2A illustrates distortion to the nipple region 150 as a partial vacuum is created through motions of lips 220 and a tongue 210. FIG. 2B illustrates a visualization of imaging data overlaid on FIG. 2A. The imaging data can provide dimensions, such as length, height, and width, of the distorted nipple. In some instances, the imaging can occur while a child is actively latched on the breast. For example, the imaging can occur while a child is nursing causing the breast and nipple to be in an active lactation state.

Figure 3:
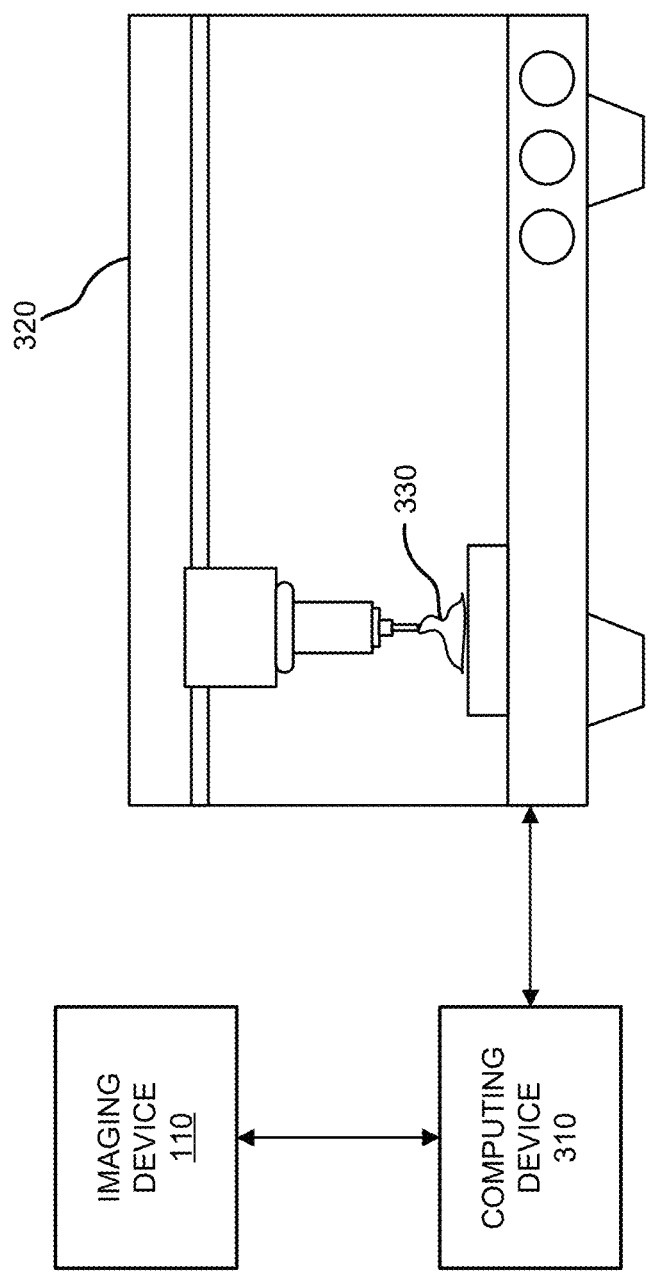
FIG. 3 shows a device for 3D printing an artificial nipple.

In an aspect, as shown in FIG. 3, imaging data can be provided to a computing device 310 from the imaging device 110. In an aspect, the computing device 310 from the imaging device 110 can comprise a single device. The computing device 310 can be in communication with a 3D printer 320. The computing device 310 can be configured to perform any necessary operations on the imaging data in order to provide the 3D printer 320 with a 3D model capable of being used to produce an artificial nipple 330. In some instances, 3D printing can result in structural artifacts, such as the formation of fine lines in the reproduced/artificial nipple, that are not present in the original nipple that was imaged. In some aspects, at least a portion of the artificial nipple comprises a reproduction of the nipple region. Other portions of the artificial nipple can be simply structural regions used for fitting onto a bottle or pacifier base.

In some instances, the artificial nipple is produced for a bottle or pacifier. In some instances, the artificial nipple attaches to a pacifier base or bottle. Thus, in some instances, the artificial nipple comprises a base section that is dimensionally compatible with a conventional baby bottle or pacifier base. In some instances, a pacifier base would be understood to be the portion of a pacifier that remains outside of the mouth when the pacifier is in use. In some instances, a pacifier base comprises a guard which is larger than the mouth of the subject using the pacifier, preventing the pacifier from becoming a choking hazard. A guard can be made of, but is not limited to, plastic, silicone, or latex. A pacifier base can further comprise a ring or a handle on the opposite side of the guard from the nipple. In some instances, the ring or handle is made of the same material as the guard. In some instances, the ring or handle is made of a different material from the guard. In some instances, the artificial nipple is generated as a single unit with the pacifier base. For example, the artificial nipple and pacifier base can be 3D printed as a single unit.

In some instances, the breast, and therefore the nipple region being imaged, can be a human breast and nipple region.

In some instances, the artificial nipple produced by the disclosed methods closely resembles a naturally occurring nipple of a child's mother or wet nurse in an active lactation state. The term "closely resembles," as used herein, can mean an artificial nipple that is reproduced within a 5% deviation from the imaged nipple region. In some instances, a 5% deviation can be based on dimensions such as height, length, width or other measurements obtained during imaging. As used herein, the term "child" can be a human child or a non-human child. The phrase "active lactation state" refers to the shape of a nipple during lactation or nursing.

In some instances, the internal dimensions of an artificial nipple can be reduced up to 60%, 65%, 70%, 75%, 80%, 85%, 90%, or 95% of the external dimensions to provide for an overall thickness of that is suitable for purposes of a nursing child without the risk of a choking hazard.

Disclosed are artificial nipples produced by the disclosed methods. In some aspects, disclosed are artificial nipples produced by imaging a nipple region of a breast, wherein at least a portion of the breast comprising the nipple region is distorted due to at least a partial vacuum created through motions of lips and a tongue, wherein the imaging provides imaging data of the nipple region; and generating, based on the imaging data, an artificial nipple.

Figure 4:
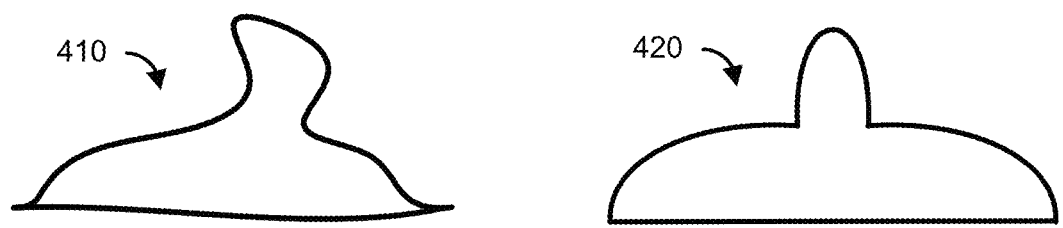
FIG. 4 shows a distorted nipple region 410 and a natural shaped nipple region 420.

In some aspects, as shown in FIG. 4, at least a portion of an artificial nipple is the shape of a distorted nipple 410. The natural shape of a nipple 420 can be distorted due to at least a partial vacuum created through motions of lips and a tongue. An artificial nipple comprising a distorted nipple 410 provides a In some aspects, an artificial nipple is attached to a pacifier base or bottle.

In some aspects, at least a portion of the artificial nipple comprises a reproduction of the nipple region. Artificial nipples can also comprise a structural region used for fitting onto a bottle or a pacifier base.

Also disclosed are methods of feeding a subject comprising placing an artificial nipple produced by the methods disclosed herein in the mouth of the subject, wherein the artificial nipple is attached to a container comprising food. In some aspects, a container comprising food can be a bottle.

In some aspects, food can be, but is not limited to, milk, formula, water, or rice cereal.

Also disclosed are methods of soothing a subject, comprising placing an artificial nipple produced by the methods disclosed herein in the mouth of the subject, wherein the artificial nipple is attached to a pacifier base.

Figure 5:
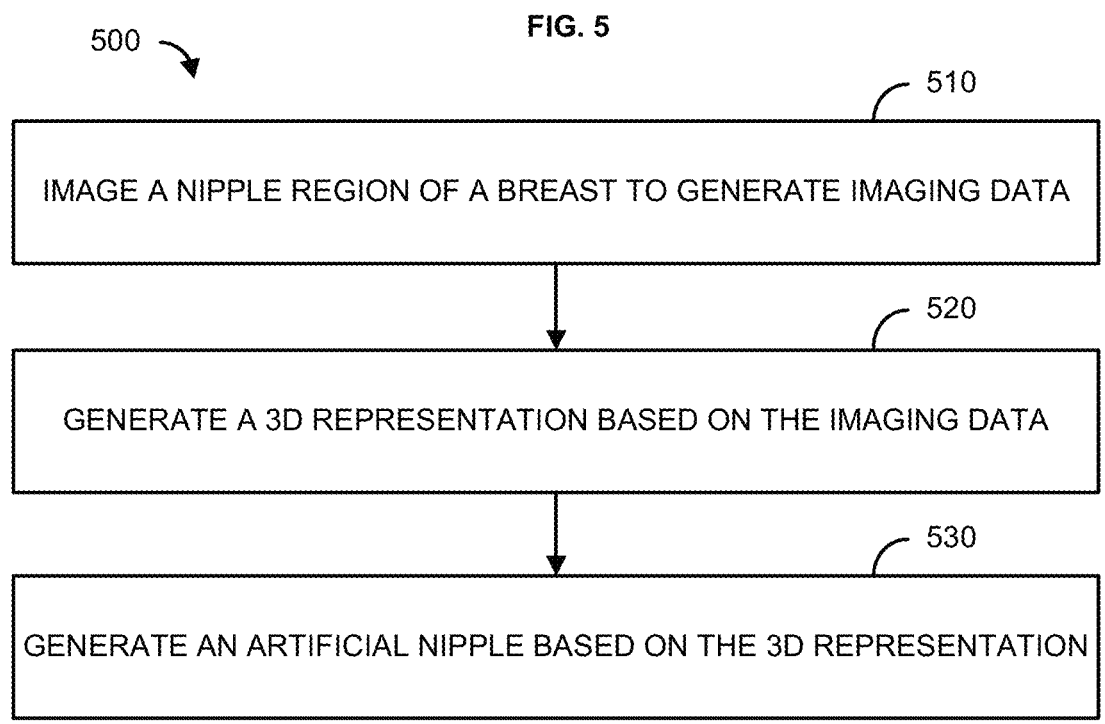
FIG. 5 is a flowchart illustrating an example method.

In an aspect, illustrated in FIG. 5, disclosed is a method 500 for producing an artificial nipple comprising imaging a nipple region of a breast at 510 to generate imaging data. At least a portion of the breast comprising the nipple region can be distorted due to at least a partial vacuum created through motions of lips and a tongue. The imaging can provide imaging data of the nipple region. The imaging data can be 3D imaging data. The imaging can comprise an ultrasound or a camera. The camera can be a 3D camera. The imaging can occur while a child is actively latched on the breast. The nipple region can be a human nipple region.

The method 500 can comprise generating, based on the imaging data of the nipple region, a digital three dimensional representation of the nipple region of the breast at 520. Digital three dimensional representation can be used as described in Bücking T M, et al. (2017) From medical imaging data to 3D printed anatomical models. PLoS ONE 12(5): e0178540; Ahmed Hosny et al. J Thorac Cardiovasc Surg 2018, 155:143-5; and www3.gehealthcare.com/en/products/categories/ultrasound/voluson/voluson_e10, each of which are incorporated by reference herein.

The method 500 can comprise generating, based on the digital three dimensional representation of the nipple region of the breast, an artificial nipple at 530. At least a portion of the artificial nipple comprises a reproduction of the nipple region. Generating the artificial nipple can comprise 3D printing. The artificial nipple can attach to a pacifier base or bottle. The artificial nipple can be produced for a bottle or pacifier.

Figure 6:
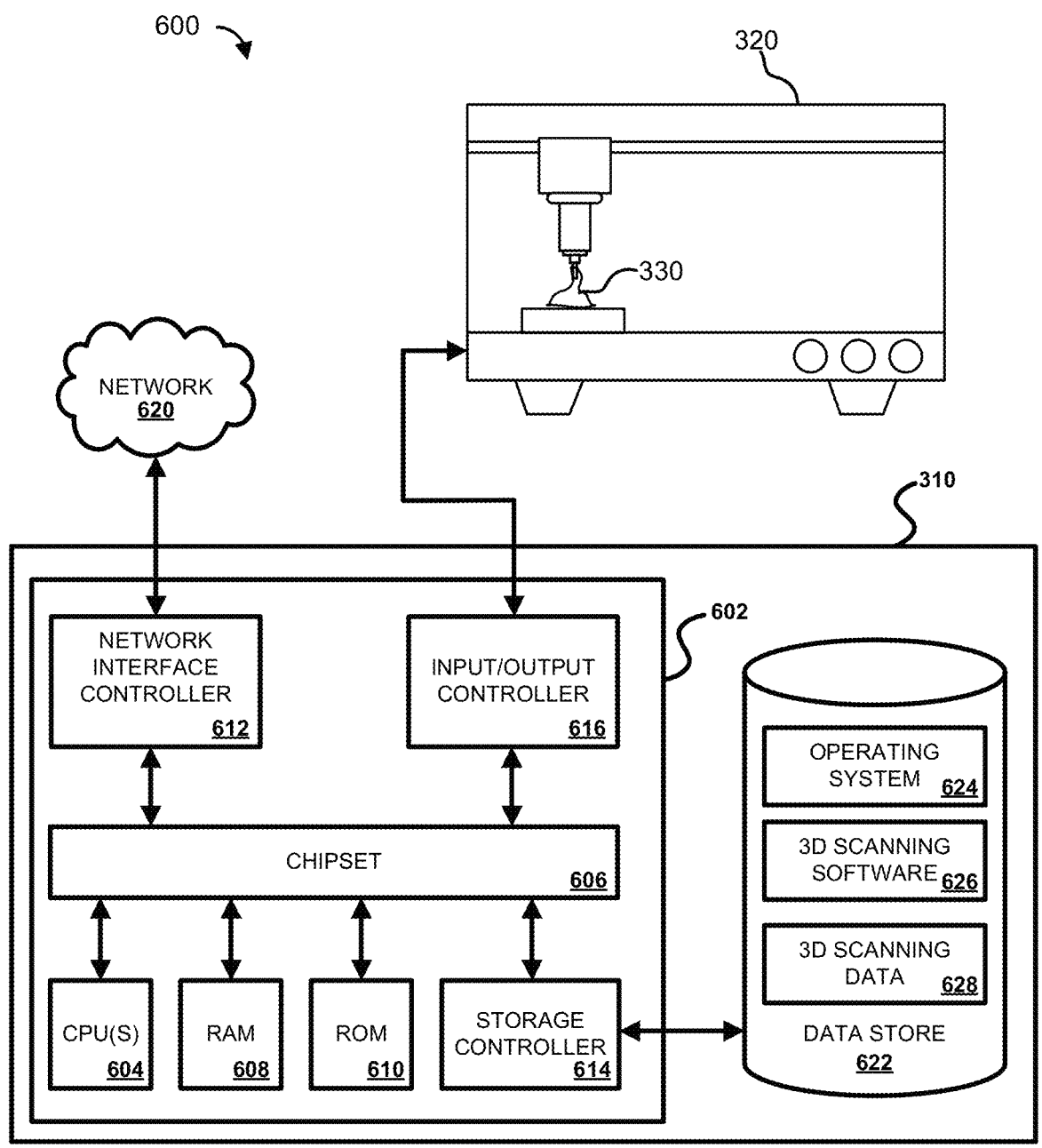
FIG. 6 is an example operating environment.

In an exemplary aspect, the methods and systems can be implemented, at least in part, on the imaging device 110 and/or the computing device 310 as illustrated in FIG. 1 and FIG. 3. The imaging device 110 and/or the computing device 310 can be embodied as one or more computing devices to perform one or more functions in one or more locations. FIG. 6 is a block diagram illustrating an exemplary operating environment 600 for performing the disclosed methods. This exemplary operating environment 600 is only an example of an operating environment and is not intended to suggest any limitation as to the scope of use or functionality of operating environment architecture. Neither should the operating environment 600 be interpreted as having any dependency or requirement relating to any one or combination of components illustrated in the exemplary operating environment 600.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices. For example, the systems and methods disclosed herein can be implemented via a computing device in the form of the computing device 310.

FIG. 6 shows an example computer architecture for the computing device 310. The computing device 310 can be configured for executing program components for conducting 3-D scanning in the manner described above. The computer architecture shown in FIG. 7 illustrates a server computer, workstation, desktop computer, laptop, tablet, network appliance, personal digital assistant ("PDA"), e-reader, digital cellular phone (smartphone), or other computing device, and may be utilized to execute any of the software components presented herein. For example, the computer architecture shown in FIG. 7 may be utilized to execute software components for performing operations as described above.

The computing device 310 includes a baseboard 602, or "motherboard," which is a printed circuit board to which a multitude of components or devices may be connected by way of a system bus or other electrical communication paths. In one illustrative example, one or more central processing units ("CPUs") 604 operate in conjunction with a chipset 606. The CPUs 604 may be standard programmable processors that perform arithmetic and logical operations necessary for the operation of the computing device 310.

The CPUs 604 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like. In the case of multiple CPUs 604, the computing device 310 can utilize parallel computing.

The chipset 606 provides an interface between the CPUs 604 and the remainder of the components and devices on the baseboard 602. The chipset 606 may provide an interface to a RAM 608, used as the main memory in the computing device 310. The chipset 606 may further provide an interface to a computer-readable storage medium such as a read-only memory ("ROM") 610 or non-volatile RAM ("NVRAM") for storing basic routines that help to startup the computing device 310 and to transfer information between the various components and devices. The ROM 610 or NVRAM may also store other software components necessary for the operation of the computing device 310 in accordance with the examples described herein.

The computing device 310 may operate in a networked environment using logical connections to remote computing devices and computer systems through a network, such as a network 620. The network 620 can comprise the Internet and/or a local area network. Other forms of communications can be used such as wired and wireless telecommunication channels, for example. The chipset 606 may include functionality for providing network connectivity through a network interface controller ("NIC") 612, such as a gigabit Ethernet adapter. The NIC 612 is capable of connecting the computing device 310 to other computing devices over the network 620. It should be appreciated that multiple NICs 612 may be present in the computing device 310, connecting the computing device to other types of networks and remote computer systems.

The computing device 310 may be connected to a data store, such as the data store 622, that provides non-volatile storage for the computing device 310. The data store 622 may store system programs, application programs, other program modules and data, which have been described in greater detail herein. The data store 622 may be connected to the computing device 310 through a storage controller 614 connected to the chipset 606. The data store 622 may comprise one or more physical storage units. The storage controller 614 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 310 may store data on the data store 622 by transforming the physical state of the physical storage units to reflect the information being stored. The specific transformation of physical state may depend on various factors, in different implementations of this description. Examples of such factors may include, but are not limited to, the technology used to implement the physical storage units, whether the data store 622 is characterized as primary or secondary storage and the like.

For example, the computing device 310 may store information to the data store 622 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 310 may further read information from the data store 622 by detecting the physical states or characteristics of one or more particular locations within the physical storage units.

In addition to the data store 622 described above, the computing device 310 may have access to other computer-readable storage media to store and retrieve information, such as program modules, data structures, or other data. It should be appreciated by those skilled in the art that computer-readable storage media is any available media that provides for the non-transitory storage of data and that may be accessed by the computing device 310.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The data store 622 may store an operating system 624 utilized to control the operation of the computing device 310. According to one example, the operating system 624 comprises the LINUX operating system. According to another example, the operating system comprises a WINDOWS® operating system from MICROSOFT Corporation. According to further examples, the operating system may comprise the UNIX operating system or the ANDROID operating system. It should be appreciated that other operating systems may also be utilized. The data store 622 may store other system or application programs and data utilized by the computing device 310, such as components that include 3D scanning software 626, 3D scanning data 628, and/or any other software components and data described above. The data store 622 can also store other programs and data not specifically identified herein.

In one example, the data store 622 or other computer-readable storage media is encoded with computer-executable instructions which, when loaded into the computing device 310, transform the computing device from a general-purpose computing system into a special-purpose computing device capable of implementing the examples described herein. These computer-executable instructions transform the computing device 310 by specifying how the CPUs 604 transition between states, as described above. According to one example, the computing device 310 has access to computer-readable storage media storing computer-executable instructions which, when executed by the computing device 310, perform the various routines described above. The computing device 310 can also include computer-readable storage media for performing any of the other computer-implemented operations described herein.

The computing device 310 may also include one or more input/output controllers 616 for receiving and processing input from a number of input devices, such as a keyboard, a mouse, a touchpad, a touch screen, an electronic stylus, or other type of input device. Similarly, the input/output controller 616 may provide output to a display, such as a computer monitor, a flat-panel display, a digital projector, a printer, a plotter, or other type of output device. One or more 3D printers 320 can be in communication with the input/output controller 616. For example, via a wired and/or wireless connection. The input/output controller 616 can transmit and/or receive data and/or instructions to and/or from the one or more 3D printers 320. It will be appreciated that the computing device 310 may not include all of the components shown in FIG. 7, may include other components that are not explicitly shown in FIG. 7, or may utilize an architecture completely different than that shown in FIG. 7.

Those skilled in the art will recognize, or be able to ascertain using no more than routine experimentation, many equivalents to the specific embodiments of the method and compositions described herein. Such equivalents are intended to be encompassed by the following claims.

I claim:

1. A method of producing an artificial nipple comprising:
   a) imaging a nipple region of a breast, wherein at least a portion of the breast comprising the nipple region is distorted due to at least a partial vacuum created through motions of lips and a tongue, wherein the imaging provides imaging data of the nipple region, wherein the imaging occurs while a child is actively latched on the breast;

b) generating, based on the imaging data of the nipple region, a digital three dimensional representation of the nipple region of the breast; and c) generating, based on the digital three dimensional representation of the nipple region of the breast, an artificial nipple.

2. The method of claim 1, wherein at least a portion of the artificial nipple comprises a reproduction of the nipple region.

3. The method of claim 1, wherein the imaging data is 3D imaging data.

4. The method of claim 1, wherein generating an artificial nipple comprises 3D printing.

5. The method of claim 1, wherein the artificial nipple attaches to a pacifier base or bottle.

6. The method of claim 1, wherein the imaging comprises an ultrasound or a camera.

7. The method of claim 6, wherein the camera is a 3D camera.

8. The method of claim 1, wherein the nipple is a human nipple.

9. The method of claim 1, wherein the artificial nipple is produced for a bottle or pacifier.

\* \* \* \* \*